(12) United States Patent
Fujiyoshi et al.

(10) Patent No.: US 8,094,470 B2
(45) Date of Patent: Jan. 10, 2012

(54) CURRENT BALANCED PUSH-PULL INVERTER CIRCUIT WITH SNUBBER AND DISCHARGE CIRCUITRY

(75) Inventors: Toshikazu Fujiyoshi, Osaka (JP); Hajime Katsushima, Osaka (JP); Kenji Morimoto, Osaka (JP); Satoshi Yamamura, Osaka (JP)

(73) Assignee: Sansha Electric Manufacturing Co., Ltd., Osaka (JP)

( * ) Notice: Subject to any disclaimer, the term of this patent is extended or adjusted under 35 U.S.C. 154(b) by 13 days.

(21) Appl. No.: 12/864,271

(22) PCT Filed: Mar. 10, 2009

(86) PCT No.: PCT/JP2009/054484
§ 371 (c)(1),
(2), (4) Date: Jul. 23, 2010

(87) PCT Pub. No.: WO2010/103612
PCT Pub. Date: Sep. 16, 2010

(65) Prior Publication Data
US 2011/0058395 A1    Mar. 10, 2011

(51) Int. Cl.
*H02M 3/335* (2006.01)
*H02M 7/538* (2006.01)
(52) U.S. Cl. .......... 363/56.08; 363/17; 363/24; 363/133
(58) Field of Classification Search ................ 363/16, 363/17, 24, 25, 26, 56.06, 56.08, 98, 132, 363/133, 134
See application file for complete search history.

(56) References Cited

U.S. PATENT DOCUMENTS

| 4,797,630 | A | * | 1/1989 | Brown | 330/264 |
| 4,926,302 | A | * | 5/1990 | Harada et al. | 363/16 |

(Continued)

FOREIGN PATENT DOCUMENTS

JP    51-133731 A    11/1976
(Continued)

OTHER PUBLICATIONS

International Search Report for corresponding International Application No. PCT/JP2009/054484 dated Jun. 16, 2009 in English (previously submitted on IDS submitted with application Jul. 23, 2010 in Japanese language).

(Continued)

*Primary Examiner* — Gary L Laxton
*Assistant Examiner* — Zekre Tsehaye
(74) *Attorney, Agent, or Firm* — Renner, Otto, Boisselle & Sklar, LLP

(57) ABSTRACT

This current balanced push-pull type inverter circuit includes first and second switching elements, and an output transformer which includes a first primary winding and a second primary winding connected in series between said first and second switching elements, and also includes a secondary winding for obtaining an output voltage. This inverter circuit also includes a first voltage supply capacitor, a second voltage supply capacitor, and a control unit. A first snubber circuit, in which a first free wheel diode and first and second snubber capacitors are connected in series, is connected in inverse parallel to the first switching element. A first discharge resistor is connected between the first snubber capacitor and a first power supply capacitor, and a second discharge resistor is connected between the second snubber capacitor and a third power supply capacitor. And a second snubber circuit and discharge resistors are connected to the second switching element as well, in a similar manner.

2 Claims, 3 Drawing Sheets

U.S. PATENT DOCUMENTS

| | | | |
|---|---|---|---|
| 6,018,203 A * | 1/2000 | David et al. | 307/52 |
| 6,914,788 B2 * | 7/2005 | Fujiyoshi et al. | 363/16 |
| 7,130,205 B2 * | 10/2006 | Peng | 363/140 |

FOREIGN PATENT DOCUMENTS

| | | |
|---|---|---|
| JP | 01-270772 A | 10/1989 |
| JP | 2001-112253 A | 4/2001 |
| JP | 2001-224172 A | 8/2001 |
| JP | 2003-219653 A | 7/2003 |

OTHER PUBLICATIONS

International Search Report for corresponding International Application No. PCT/JP2009/054484 dated Jun. 2, 2009.

* cited by examiner

CURRENT BALANCED PUSH-PULL INVERTER CIRCUIT WITH SNUBBER AND DISCHARGE CIRCUITRY

TECHNICAL FIELD

The present invention relates to an inverter circuit which includes a snubber circuit on the primary side of a transformer.

BACKGROUND ART

With an inverter circuit, when a switching element is turned OFF, a surge voltage is applied to that switching element due to the operation of leakage inductance between the primary side and the secondary side of a transformer, and due to the inductance component of the main circuit. In order to prevent this, a snubber circuit is connected in parallel with the switching element.

In a typical snubber circuit, a snubber capacitor and a snubber resistor for damping which attenuates surge voltage oscillation are connected in series. However with this type of circuit the efficiency is poor, since the charge for charging and discharging the snubber capacitor is converted to heat by the snubber resistor.

In order to eliminate the above described problem with a snubber circuit, a discharge prevention type clamp snubber circuit has been proposed, in which a diode for discharge prevention is connected in series with the snubber capacitor, so that the voltage across the switching element is clamped to the voltage to which the snubber capacitor is charged. Furthermore, along with this circuit, a discharge resistor is provided for conducting a discharge current to the power supply, when the voltage to which the snubber capacitor is charged tries to rise to be higher than this clamp voltage. With this discharge prevention type clamp snubber circuit, the efficiency is not deteriorated due to heat being generated in the snubber resistor, since no snubber resistor is provided. Moreover, since the discharge current which flows in the discharge resistor corresponds only to the amount by which the voltage to which the snubber capacitor is charged is elevated above the clamp voltage, accordingly the heat generation due to the discharge current is not great, provided that this amount of voltage elevation is not very high.

On the other hand, generally well known types of inverter circuit include the full bridge type inverter circuit, the half bridge type inverter circuit, and the center tap push-pull type inverter circuit.

With the full bridge type inverter circuit, the cost is high, since four switching elements are used.

With the half bridge type inverter circuit, while two switching elements are sufficient, the currents which flow in the switching elements and in the primary winding of the transformer are twice as great, as compared with the full bridge type inverter circuit or the center tap type inverter circuit. Due to this, it is impossible to avoid increase in cost, since the switching elements and the transformer are increased in size.

With the center tap push-pull type inverter circuit, two switching elements are sufficient, and moreover the currents which flow in the switching elements and in the primary winding of the transformer are not great, in a similar manner to the case with the full bridge type inverter circuit.

However, with a center tap push-pull type inverter circuit, since the power supply Vin is connected to the center tap of the primary winding P of the transformer, a leakage inductance is present in the combination of the left and right primary windings P. Due to this, the following problem occurs.

Via the leakage inductance described above, the surge voltage which is generated when the first switching element is turned OFF is clamped by a free wheel diode connected to the second switching element. However perfect clamping is not possible, since the leakage inductance described above is present, and there is the problem that the surge voltage described above becomes excessively great.

In the background art described above, a center tap push-pull type inverter circuit which utilizes a discharge prevention type clamp snubber circuit is proposed (refer to Patent Document #1).

With the inverter circuit disclosed in this document, since it is a center tap push-pull type inverter circuit, two switching elements are sufficient, and moreover the currents which flow in the switching elements and in the primary winding of the transformer are not great. Furthermore, since the discharge prevention type clamp snubber circuit is provided it is possible to suppress surge voltage with comparatively high efficiency. Patent Document #1: Japanese Laid-Open Patent Publication 2001-112253.

DISCLOSURE OF INVENTION

Problems to be Solved by the Invention

However, an aspect in which the inverter circuit described above is different from the full bridge type inverter circuit and the half bridge type inverter circuit (with these circuits, the clamp voltage of the snubber capacitor is roughly equal to the power supply voltage Vin) is that, since the potential difference between the snubber capacitor and the power supply is always greater than or equal to the power supply voltage Vin, accordingly a current due to this large potential difference comes to flow continuously in the discharge resistor, so that the losses become large and the efficiency becomes bad. Furthermore, since this is a center tap push-pull type inverter circuit, accordingly the induced voltage due to the leakage inductance that is present between the combination of the left and right primary windings P is excessively great, and there is the problem that the burden upon the snubber circuit for clamping this excessively great voltage is heavy.

Due to this, with the inverter circuit disclosed in the above described Patent Document #1, the current due to the potential difference described above comes to flow continuously in the discharge resistor, so that there is the problem that the overall efficiency of the circuit becomes poor, and moreover there is the inconvenience that the snubber circuit also becomes large.

Thus, an object of the present invention is to provide an inverter circuit with which there is no current which flows continuously in the discharge resistor due to potential difference between the clamp voltage of the snubber capacitor and the power supply, so that, due to this, the efficiency of this inverter circuit becomes high.

Another object of the present invention is to provide an inverter circuit for which two switching elements are sufficient, in which the current which flows in each of these switching elements is low, and in which no excessively great surge voltage is applied to these switching elements.

Means for Solving Problem

The inverter circuit of the present invention includes: a first switching element; a second switching element; an output transformer, to a primary side of which current is supplied via the first switching element and the second switching element, and from a secondary side of which current is outputted to a load; a first free wheel diode which is connected in inverse parallel to the first switching element; a second free wheel diode which is connected in inverse parallel to the second switching element; a first snubber circuit, connected in parallel to the first switching element, and in which a first snubber capacitor, a first snubber diode and a second snubber capacitor are connected in series; and a second snubber circuit, connected in parallel to the second switching element, and in which a third snubber capacitor, a second snubber diode and a fourth snubber capacitor are connected in series.

And the inverter circuit of the present invention also includes: a first voltage supply capacitor which applies voltage to the first switching element; a second voltage supply capacitor which applies voltage to the second switching element; a first discharge resistor, connected between the first snubber circuit and the first voltage supply capacitor, and in which a discharge current flows from the first snubber capacitor; a second discharge resistor, connected between the first snubber circuit and the second voltage supply capacitor, and in which a discharge current flows from the second snubber capacitor; a third discharge resistor, connected between the second snubber circuit and the second voltage supply capacitor, and in which a discharge current flows from the third snubber capacitor; and a fourth discharge resistor, connected between the second snubber circuit and the first voltage supply capacitor, and in which a discharge current flows from the fourth snubber capacitor.

The first switching element and the second switching element may, for example, be IGBTs (Insulated Gate type Bipolar Transistors) or MOS-FETs. The application of surge voltage to the first switching element and the second switching element is prevented by the operation of the first snubber circuit and the second snubber circuit.

Since the surplus charge and the power supply voltage Vin is charged into each of the first and second snubber capacitors of the first snubber circuit, accordingly this surplus charge is discharged by the first discharge resistor and the second discharge resistor. The surplus charge of the first snubber capacitor is discharged to the first voltage supply capacitor, while the surplus charge of the second snubber capacitor is discharged to the second voltage supply capacitor.

In a similar manner, the surplus charge over the power supply voltage Vin is charged into each of the third and fourth snubber capacitors of the second snubber circuit. Thus, this surplus charge is discharged by the third discharge resistor and the fourth discharge resistor. The surplus charge of the third snubber capacitor is discharged to the second voltage supply capacitor, while the surplus charge of the fourth snubber capacitor is discharged to the first voltage supply capacitor.

In the first snubber circuit, the first snubber capacitor and the second snubber capacitor are connected in series via the first snubber diode. This first snubber diode is mounted so as to be in the forward direction during charging, and so as to be in the reverse direction during discharge. Accordingly, during charging, the first snubber capacitor and the second snubber capacitor are charged along the same charging path, while, during discharge, they are discharged along different discharge paths. These discharge paths are, for the first snubber capacitor, a discharge path from the first discharge resistor to the first voltage supply capacitor, and, for the second snubber capacitor, a discharge path from the second discharge resistor to the first second supply capacitor.

With the structure described above, during charging, since the first snubber capacitor and the second snubber capacitor are charged up in the state of being connected in series, accordingly half of the surplus charge and the power supply voltage Vin is charged into each of these snubber capacitors. On the other hand, the potentials of the first voltage supply capacitor and the second voltage supply capacitor are both Vin. In this situation, (Vin+½×the surplus charge−Vin) equals to (½×the surplus charge), so that just half of the surplus charge comes to be discharged from each of the snubber capacitors to the first voltage supply capacitor or to the second voltage supply capacitor. Accordingly, the amounts of heat generated in the discharge resistors due to these discharge currents are extremely low.

The operation of the second snubber circuit is the same as that of the first snubber circuit described above.

The power supply unit has a structure as described below.

The output transformer includes a first primary winding which is connected between the positive side of the first switching element and the positive side of the second switching element, and a second primary winding which is connected between the negative side of the first switching element and the negative side of the second switching element. There is also included a power supply, connected between a center tap of the first primary winding and a center tap of the second primary winding, and which supplies energy to the first and second voltage supply capacitors via the first primary winding and the second primary winding.

The first voltage supply capacitor is connected between a first connection point at which the first primary winding is connected to the second switching element and the first switching element, and applies voltage to the first switching element via the first primary winding.

And the second voltage supply capacitor is connected between a second connection point at which the first primary winding is connected to the first switching element and the second switching element, and applies voltage to the second switching element via the first primary winding.

With the power supply described above, the first and second voltage source capacitors are charged up to the power supply voltage Vin, and the first and second switching elements operate at the power supply voltage Vin to which the voltage supply capacitors are charged up.

Effects of the Invention

According to the present invention, two switching elements are sufficient, and the value of the current flowing in each switching element is also small. Moreover, no excessively great surge voltage is applied to the switching elements. Furthermore, the loss in the discharge resistors is small, so that it is possible to provide an inverter circuit whose efficiency is good.

EXPLANATION OF REFERENCE NUMBERS

S1—first switching element
S2—second switching element
C1—first power supply voltage capacitor
C2—second power supply voltage capacitor
RS1—first snubber circuit
RS2—second snubber circuit
R1~R4—discharge resistors
CNT—control unit

BEST MODE FOR CARRYING OUT THE INVENTION

Figure 1:
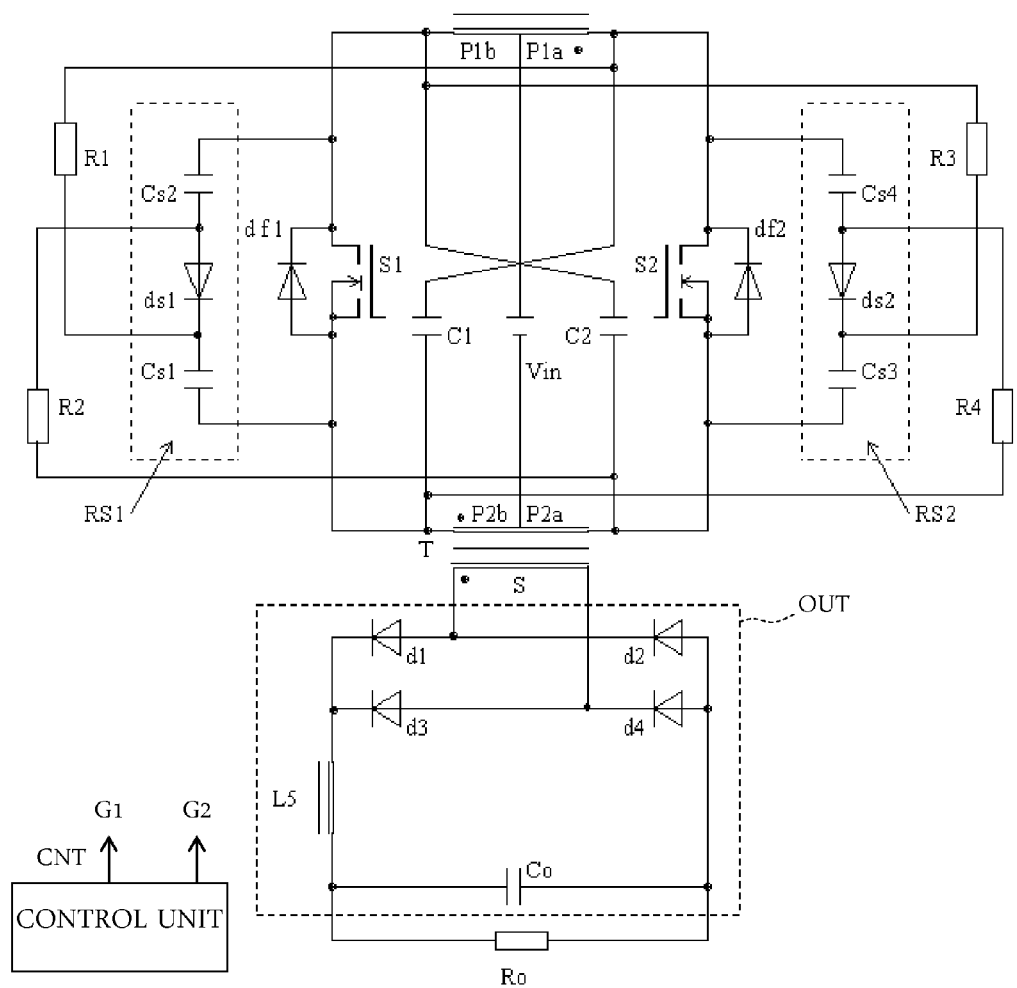
FIG. 1 is a circuit diagram of a DC-DC converter circuit which is an embodiment of the present invention.

FIG. 1 is a circuit diagram of a DC-DC converter circuit which is a first embodiment of the present invention. This DC-DC converter circuit comprises an inverter circuit, a rectification circuit OUT which is connected to the secondary side of an output transformer T (hereinafter referred to as the "transformer"), and a control unit CNT.

The inverter circuit is built as a current balanced push-pull type (Current Balanced P.P. type) inverter circuit, and the details thereof will be described hereinafter.

Figure 2:
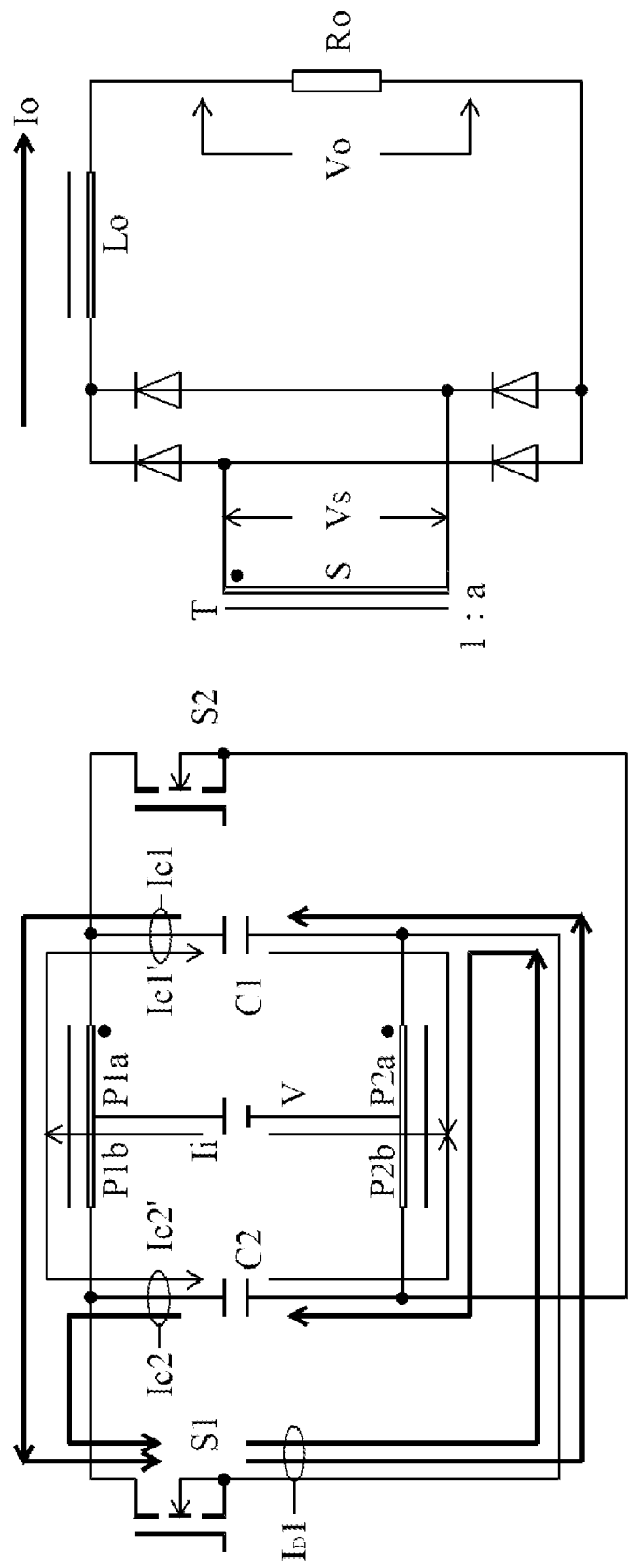
FIG. 2 is a basic circuit diagram of a current balanced push-pull type inverter circuit.

A basic circuit for this current balanced push-pull type inverter circuit is shown in FIG. 2.

This inverter circuit comprises: a first switching element S1, a second switching element S2, a first primary winding P1 (P1a and P1b) which is connected in series between the positive side of the first switching element S1 and the positive side of the second switching element S2, and a second primary winding P2 (P2a and P2b) which is connected in series between the negative side of the first switching element S1 and the negative side of the second switching element S2. Furthermore, this inverter circuit comprises: a power supply V which is connected between a center tap of the first primary winding P1 and a center tap of the second primary winding P2; a capacitor C1 which is a first voltage source, and which is connected between a first terminal of the first primary winding P1 and a first terminal of the second primary winding P2; and a capacitor C2 which is a second voltage source, and which is connected between a second terminal of the first primary winding P1 and a second terminal of the second primary winding P2. A diode bridge rectification circuit, a reactor $L_0$ which smoothes the rectified output, and a load $R_0$ are connected to the secondary winding S of the transformer T.

In the structure described above, the first switching element S1 and the second switching element S2 are alternately turned ON and OFF by a control unit (not shown in the figures).

When the first switching element S1 is turned ON so that the voltage V is applied to both the first primary winding P1 and the second primary winding P2 by the capacitor C1, which constitutes a first voltage source, and by the capacitor C2, which constitutes a second voltage source, so that an output voltage Vs is generated in the secondary winding Vs, then an output current $I_0$ flows in the load $R_0$. Due to this, currents of 0.5 $I_0$·a flow in both the primary windings P1 and P2 (the winding ratio of the transformer=1:a). At this time the element current $I_D1$, which is a combination of the current flowing in the switching element S1 from the capacitor C1 and the current flowing in the switching element S1 from the capacitor C2, is:

$$I_D1 = I_0 \cdot a$$

The respective charging (DC) currents Ic1' and Ic2' of the capacitors C1 and C2 are each half (0.5 Ii) of Ii, which is the output power divided by the power supply voltage. Accordingly, the combined currents Ic1 and Ic2 respectively flowing in the capacitors C1 and C2 are each equal to the discharge current–the charging current=0.5($I_D1$–Ii).

On the other hand, the current flowing in the primary windings P1a and P2b is the charging current subtracted, while the current flowing in the primary windings P1b and P2a has the charging current added. In other words, $$IP1a, IP2b = 0.5(I_D1 - Ii)$$

$$IP1b, IP2a = 0.5(I_D1 + Ii)$$

This current imbalance presents no problem. The reason why is that the equilibrium of the average winding current is maintained by the switching elements S1 and S2 being turned ON and OFF alternatingly (i.e. by the current commutating). Accordingly, in particular, the problem of the core of the transformer becoming magnetized disproportionately does not arise.

Furthermore, as seen from the power supply V, the polarities of the windings P1a, P1b, P2a, and P2b are mutually opposite. Due to this, the transformer T is not directly excited by the power supply voltage. Moreover no problem arises of the core being magnetized by direct current, since the charging currents Ic1' and Ic2' which respectively flow in the primary windings P1 and P2 are opposite in direction.

With the structure described above, the alternating voltages applied to each of the first primary winding P1 and to the second primary winding P2 both become equal to the power supply voltage V, which is the same as in the case of a full bridge type inverter. Moreover, the center taps provided to the first primary winding P1 and to the second primary winding P2 are for energy supply from the power supply V, and both the first primary winding P1 and the second primary winding P2 are utilized by the current shown in FIG. 2 by the thick line flowing to the output power supply. Due to this, neither one of the windings becomes idle every half cycle, contrast to the case of a center tap push-pull type inverter. In other words, there is no requirement to take into consideration leakage inductance between P1a and P1b, and between P2a and P2b, and no surge voltage is generated during current turnaround due to any such leakage inductance. Accordingly there is no need to provide close coupling between P1a and P1b, between P2a and P2b, or between P1 and P2, with the objective of preventing surge voltage. Furthermore, the charging currents of 0.5 Ii always flow to the capacitors C1 and C2 from the power supply V via the first primary winding P1 and the second primary winding P2. During this charging, the current Ii supplied from the power supply V becomes continuous DC, since the leakage inductance between those windings P1 and P2 functions as a filter which eliminates ripple component. Due to this, a battery which is utilized as the power supply V may be a battery which is intolerant to ripple component (i.e. whose expected lifetime is lowered by ripple), for example a fuel cell. It should be understood that the combination of the first primary winding P1 and the secondary winding S, and the combination of the second primary winding P2 and the secondary winding S, must be symmetric, because it is necessary to ensure equilibrium of current distribution.

In this manner, with this current balanced push-pull type inverter circuit, there are the advantageous aspects that there is no requirement for high current to flow in the switching elements as in the case of a half bridge type inverter circuit, and moreover that it is also not necessary to provide any countermeasures against surge voltage due to leakage inductance between P1a and P1b or between P2a and P2b.

The DC-DC converter circuit shown in FIG. 1 uses the current balanced push-pull type inverter circuit having the above basic structure. Moreover, snubber circuits are added to this current balanced push-pull type inverter circuit.

In other words, these snubber circuits consist of a first snubber circuit RS1 which is connected in parallel with the first switching element S1, and a second snubber circuit RS2 which is connected in parallel with the second switching element S2.

The first snubber circuit RS1 is a series circuit of a first snubber diode ds1 and a first snubber capacitor Cs1 and a second snubber capacitor Cs2, which are connected to the two ends of this diode ds1. And the second snubber circuit RS2 is a series circuit of a second snubber diode ds2 and a third snubber capacitor Cs3 and a fourth snubber capacitor Cs4, which are connected to the two ends of this diode ds2.

A first discharge resistor R1 is connected between the first snubber capacitor Cs1 of the first snubber circuit RS1 and the first voltage supply capacitor C1, so that discharge current from the first snubber capacitor Cs1 flows through this resistor R1.

And a second discharge resistor R2 is connected between the second snubber capacitor Cs2 of the first snubber circuit RS1 and the second voltage supply capacitor C2, so that discharge current from the second snubber capacitor Cs2 flows through this resistor R2.

Moreover, a third discharge resistor R3 is connected between the third snubber capacitor Cs3 of the second snubber circuit RS2 and the second voltage supply capacitor C2, so that discharge current from the third snubber capacitor Cs3 flows through this resistor R3.

Finally, a fourth discharge resistor R4 is connected between the fourth snubber capacitor Cs4 of the second snubber circuit RS2 and the first voltage supply capacitor C1, so that discharge current from the fourth snubber capacitor Cs4 flows through this resistor R4.

And free wheel diodes df1 and df2 are respectively connected in inverse parallel to the switching elements S1 and S2.

Next, the operation will be explained.

Figure 3:
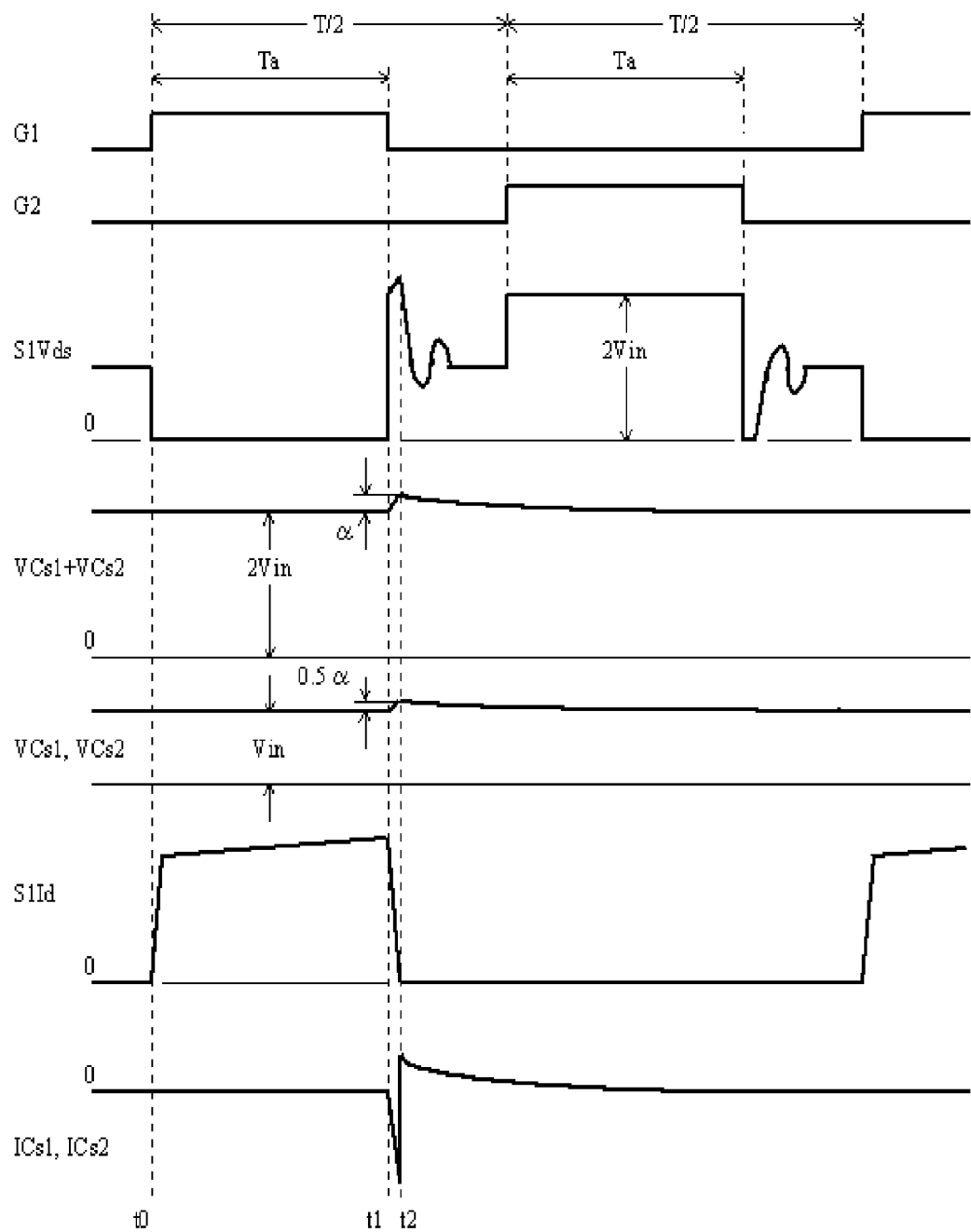
FIG. 3 is a timing chart for the DC-DC converter circuit described above.

FIG. 3 is a waveform diagram for the DC-DC converter circuit described above.

When the control signal G1 from the control unit CNT goes to ON at the time point t0, the switching element S1 is turned ON. When this is done, power is supplied to the load $R_0$ via the transformer T, and a current S1Id flows in the switching element S1. This current S1Id increases linearly at a constant slope, due to the current limitation operation of the leakage inductance Le between the primary side and the secondary side of the transformer T. At this time, the voltage S2Vds between the two ends of the switching element S2 is equal to 2 Vin. The charge which is charged into the first snubber capacitor Cs1 and the second snubber capacitor Cs2 is not short circuited by the switching element S1, since the first snubber diode ds1 is present.

And, when the switching element S1 goes to OFF at the time point t1, the voltage induced by the leakage inductance Le, which tends to make the current S1Id continue to flow, is added to VC1 (Vin), and then, the voltage S1Vds becomes the induced voltage of Le+Vin. When this induced voltage rises to Vin, the free wheel diode df2 which is connected in inverse parallel with the switching element S2 becomes continuous. And, when this happens, a current S1Id flows to the capacitor C2, and the energy of the leakage inductance Le is regenerated to the power supply. Accordingly, ideally, the above described induced voltage is clamped to Vin, and the voltage S1Vds does not rise above 2 Vin.

However actually the voltage S1Vds does rise to above the voltage 2 Vin, due to the presence of residual inductances other than the leakage inductance (for example, residual inductances are present between the capacitor C1 and the switching element S1, and between the capacitor C2 and the diode df2), and due to continuity delay in the diode df2.

Thus, with the converter of this embodiment, at this time, due to this voltage rising above the voltage 2 Vin, charging currents ICs1 and ICs2 flow in the snubber capacitors of the first snubber circuit (in other words, in the first snubber capacitor Cs1 and the second snubber capacitor Cs2), so that these snubber capacitors are charged up.

Due to this, in the time period t1 to t2, the charged voltage of the snubber capacitors described above becomes:

$$VCs1+VCs2=2Vin+\alpha \qquad \text{(Equation 1)}$$

In other words, each of the voltages VCs1 and VCs2 becomes Vin+0.5 α. It should be understood that the slope of the voltage S1Vds is steep, since VCs1+VCs2 is already charged up to 2 Vin at the time point t1.

When the current S1Id becomes zero at the time point t2, the voltage S1Vds converges to the voltage Vin over the ringing period due to the resonance of the leakage inductance Le and the residual inductance of the circuitry, and the output capacitance of the switching element S1 and the floating capacitance of the circuitry.

And, due to the discharge prevention operation of the diode ds1, VCs1+VCs2 is kept at 2 Vin+α.

As explained above, when the switching element S1 is turned OFF, and when the voltage S1Vds generated in the switching element S1 tries to exceed 2 Vin, the voltage S1Vds does not become greater than 2 Vin after the first snubber capacitor Cs1 and the second snubber capacitor Cs2 are charged up, so that it is possible to prevent any excessively great surge voltage being applied to the switching element S1.

However, when the charging of these snubber capacitors Cs1 and Cs2 is repeated each cycle, VCs1+VCs2 rises abnormally, which is undesirable. Thus, in the interval after the time point t2 until the next cycle starts and the switching element S1 goes to OFF for a second time, the amount a by which VCs1+VCs2 has risen (refer to Equation 1) is discharged, so as to make VCs1+VCs2=2 Vin.

This discharge of the amount α is performed via the discharge resistors R1 and R2. The discharge of the amount 0.5 α for the capacitor Cs1 is performed via the discharge resistor R1 to the voltage supply capacitor C1, while the discharge of the amount 0.5 α for the capacitor Cs2 is performed via the discharge resistor R2 to the voltage supply capacitor C2. Since the voltages of the voltage supply capacitors C1 and C2 are Vin, accordingly, in the state in which Vin+0.5 α is charged into both of the capacitors Cs1 and Cs2, only the amounts 0.5 α come to be discharged into the voltage supply capacitors C1 and C2. The discharge currents are not large, since these discharges are not discharge of the charged potentials Vin of the capacitors C1 and C2, but rather each is only a discharge of the amount 0.5 α.

The above operation is the same for the second snubber circuit RS2, and moreover is repeated for each cycle.

The DC-DC converter circuit of this embodiment is characterized: in that two voltage supply capacitors are provided to the power supply unit; in that, in each of the first snubber circuit and the second snubber circuit, two snubber capacitors are connected in series via a snubber diode; and in that, from each of the two snubber capacitors which are connected in series, a discharge path is provided to the first voltage supply capacitor and the second voltage supply capacitor. By providing this type of structure, it becomes possible to discharge only 0.5 α of the above described amount a of voltage to each of the two voltage supply capacitors, so that it is possible to provide a circuit which has high efficiency.

The invention claimed is:

1. An inverter circuit, comprising:
   a first switching element;
   a second switching element;
   an output transformer, to a primary side of which current is supplied via said first switching element and said second switching element, and from a secondary side of which current is outputted to a load;
   a first free wheel diode which is connected in inverse parallel to said first switching element;

a second free wheel diode which is connected in inverse parallel to said second switching element;

a first snubber circuit, connected in parallel to said first switching element, and in which a first snubber capacitor, a first snubber diode, and a second snubber capacitor are connected in series;

a second snubber circuit, connected in parallel to said second switching element, and in which a third snubber capacitor, a second snubber diode, and a fourth snubber capacitor are connected in series;

a first voltage supply capacitor which applies voltage to said first switching element;

a second voltage supply capacitor which applies voltage to said second switching element;

a first discharge resistor, connected between said first snubber circuit and said first voltage supply capacitor, and in which a discharge current flows from said first snubber capacitor;

a second discharge resistor, connected between said first snubber circuit and said second voltage supply capacitor, and in which a discharge current flows from said second snubber capacitor;

a third discharge resistor, connected between said second snubber circuit and said second voltage supply capacitor, and in which a discharge current flows from said third snubber capacitor; and a fourth discharge resistor, connected between said second snubber circuit and said first voltage supply capacitor, and in which a discharge current flows from said fourth snubber capacitor.

2. An inverter circuit according to claim 1, wherein:

said output transformer comprises a first primary winding connected between the positive side of said first switching element and the positive side of said second switching element, and a second primary winding connected between the negative side of said first switching element and the negative side of said second switching element;

and further comprising a power supply, connected between a center tap of said first primary winding and a center tap of said second primary winding, and supplying energy to said first and second voltage supply capacitors via said first primary winding and said second primary winding;

and wherein:

said first voltage supply capacitor is connected between a first connection point at which said first primary winding is connected to said second switching element and said first switching element, and applies voltage to said first switching element via said first primary winding; and said second voltage supply capacitor is connected between a second connection point at which said first primary winding is connected to said first switching element and said second switching element, and applies voltage to said second switching element via said first primary winding.

* * * * *